(12) United States Patent
Sasaki

(10) Patent No.: US 11,968,653 B2
(45) Date of Patent: Apr. 23, 2024

(54) BASE STATION, RADIO TERMINAL, AND METHODS THEREFOR

(71) Applicant: NEC Corporation, Tokyo (JP)

(72) Inventor: Takahiro Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 495 days.

(21) Appl. No.: 17/276,331

(22) PCT Filed: Jun. 28, 2019

(86) PCT No.: PCT/JP2019/025951
§ 371 (c)(1),
(2) Date: Mar. 15, 2021

(87) PCT Pub. No.: WO2020/059243
PCT Pub. Date: Mar. 26, 2020

(65) Prior Publication Data
US 2022/0046617 A1 Feb. 10, 2022

(30) Foreign Application Priority Data
Sep. 19, 2018 (JP) .................. 2018-175191

(51) Int. Cl.
*H04W 72/044* (2023.01)
*H04W 72/23* (2023.01)
(52) U.S. Cl.
CPC ......... *H04W 72/044* (2013.01); *H04W 72/23* (2023.01)

(58) Field of Classification Search
CPC ........... H04W 72/044; H04W 36/0022; H04W 36/0033; H04W 36/12; H04W 36/14; H04W 36/32; H04W 72/23
See application file for complete search history.

(56) References Cited

U.S. PATENT DOCUMENTS

2018/0049203 A1* 2/2018 Xue .................... H04L 5/0035

FOREIGN PATENT DOCUMENTS

CA     3040175 A1 * 12/2019 ......... H04L 27/2602

OTHER PUBLICATIONS

International Search Report for PCT Application No. PCT/JP2019/025951, dated Aug. 13, 2019.
3GPP TS 38.212 V15.2.0 (Jun. 2018), 3rd Generation Partnership Project; Technical Specification Group Radio Access Network; NR; Multiplexing and channel coding (Release 15), Jun. 2018, pp. 1-98.
(Continued)

*Primary Examiner* — Zhensheng Zhang
(74) *Attorney, Agent, or Firm* — Sughrue Mion, PLLC

(57) ABSTRACT

A base station (1) transmits, to a radio terminal (2), downlink control information including a first field for indicating frequency domain resources and a second field for indicating time domain resources allocated to the radio terminal (2). The base station (1) reduces the size of the first field as it increases the size of the second field. This can, for example, contribute to improving flexibility in time domain resource assignment without increasing the size of the downlink control information (e.g., scheduling DCI) that indicates radio resources allocated to the radio terminal.

18 Claims, 6 Drawing Sheets

(56) References Cited

OTHER PUBLICATIONS

3GPP TS 38.214 V15.2.0 (Jun. 2018), 3rd Generation Partnership Project; Technical Specification Group Radio Access Network;NR; Physical layer procedures for data (Release 15), Jun. 2018, pp. 1-95.

NTT Docomo, Samsung, Panasonic, KDDI, OPPO, Ericsson, CATT, AT & T, vivo, Nokia, NSB, NTT, Sharp, ZTE, GE, "WF on PUSCH time-domain resource allocation", 3GPP TSG RAN WG1 Meeting 93, R1-1807886, Busan, Korea, May 21-25, 2018.

Qualcomm Incorporated, "Remaining Issues on BWP", 3GPP TSG RAN WG1 Meeting #93, R1-1807368, Busan, Korea, May 21-25, 2018, pp. 1-19.

* cited by examiner

BASE STATION, RADIO TERMINAL, AND METHODS THEREFOR

This application is a National Stage Entry of PCT/JP2019/025951 filed on Jun. 28, 2019, which claims priority from Japanese Patent Application 2018-175191 filed on Sep. 19, 2018, the contents of all of which are incorporated herein by reference, in their entirety.

TECHNICAL FIELD

The present disclosure relates to a radio communication system and, in particular, to a data format of downlink control information indicating radio resources allocated to a radio terminal.

BACKGROUND ART

The 3rd Generation Partnership Project (3GPP) has been working on the standardization for the fifth generation mobile communication system (5G) to make 5G a commercial reality in 2020 or later. 5G is expected to be realized by continuous enhancement/evolution of LTE and LTE-Advanced and an innovative enhancement/evolution by an introduction of a new 5G air interface (i.e., a new Radio Access Technology (RAT)). The new RAT supports, for example, frequency bands higher than the frequency bands (e.g., 6 GHz or lower) supported by LTE/LTE-Advanced and its continuous evolution. For example, the new RAT supports centimeter-wave bands (10 GHz or higher) and millimeter-wave bands (30 GHz or higher).

In this specification, the fifth generation mobile communication system is referred to as a 5G System or a Next Generation (NextGen) System (NG System). The new RAT for the 5G System is referred to as a New Radio (NR), a 5G RAT, or a NG RAT. A new Radio Access Network (RAN) for the 5G System is referred to as a NextGen RAN (NG-RAN) or a 5G-RAN. A new base station in the NG-RAN is referred to as a gNodeB (gNB). A new core network for the 5G System is referred to as a 5G Core Network (5GC) or a NextGen Core (NG Core). A radio terminal (i.e., User Equipment (UE)) capable of being connected to the 5G System is referred to as 5G UE or NextGen UE (NG UE), or simply referred to as UE.

The term "LTE" used in this specification includes enhancement/evolution of LTE and LTE-Advanced to provide interworking with the 5G System, unless otherwise specified. The enhancement/evolution of LTE and LTE-Advanced for the interworking with the 5G System is referred to as LTE-Advanced Pro, LTE+, or enhanced LTE (eLTE). Further, terms related to LTE networks and logical entities used in this specification, such as "Evolved Packet Core (EPC)", "Mobility Management Entity (MME)", "Serving Gateway (S-GW)", and "Packet Data Network (PDN) Gateway (P-GW))", include their enhancement/evolution to provide interworking with the 5G System, unless otherwise specified. Enhanced EPC, enhanced MME, enhanced S-GW, and enhanced P-GW are referred to, for example, as enhanced EPC (eEPC), enhanced MME (eMME), enhanced S-GW (eS-GW), and enhanced P-GW (eP-GW), respectively.

The NR supports use of different sets of radio parameters in multiple frequency bands. Each radio parameter set is referred to as "numerology". Orthogonal Frequency Division Multiplexing (OFDM) numerology for an OFDM system includes, for example, subcarrier spacing, system bandwidth, Transmission Time Interval (TTI) length, subframe duration, cyclic prefix length, and symbol duration. The 5G system supports various types of services having different service requirements, including, for example, enhanced Mobile Broad Band (eMBB), Ultra Reliable and Low Latency Communication (URLLC), and M2M communication with a large number of connections (e.g., massive Machine Type Communication (mMTC)). Numerology selection depends on service requirements.

The NR supports channel bandwidths wider than those of the LTE (e.g., 100s of MHz). One channel bandwidth (i.e., a BWChannel) is a radio frequency (RF) bandwidth supporting one NR carrier. The channel bandwidth is also referred to as a system bandwidth. While the LTE supports channel bandwidths up to 20 MHz, the 5G NR supports channel bandwidths, for example, up to 500 MHz.

In order to effectively support multiple 5G services, such as wideband services like eMBB and narrow-bandwidth services like Internet of Things (IoT), it is preferable to multiplex these services onto a single channel bandwidth. Further, if every 5G UE needs to support transmission and reception in a transmission bandwidth corresponding to the entire channel bandwidth, this may hinder achievement of lower cost and lower power consumption of UEs for narrow-bandwidth IoT services. Thus, the 3GPP allows one or more bandwidth parts (BWPs) to be configured in the carrier bandwidth (i.e., channel bandwidth or system bandwidth) of each NR component carrier. The bandwidth part is also referred to as carrier bandwidth part. Multiple BWPs may be used for different frequency division multiplexing (FDM) schemes using different numerologies (e.g., subcarrier spacing (SCS)). For example, multiple BWPs may have different SCSs and different bandwidths.

In one example, the channel bandwidth of one component carrier is divided into BWP #1 and BWP #2, and these two BWPs are used for FDM schemes using different numerologies (e.g., different subcarrier spacing). In another example, narrowband BWP #1 is set in a channel bandwidth of one component carrier and narrowband BWP #2 narrower than BWP #1 is further set within the BWP #1. When BWP #1 or BWP #2 is activated for the UE, this UE can reduce its power consumption by refraining from performing reception and transmission within the channel bandwidth except the active BWP.

One bandwidth part (BWP) is frequency-consecutive and consists of contiguous physical resource blocks (PRBs). The bandwidth of one BWP is at least as large as a synchronization signal (SS)/physical broadcast channel (PBCH) block. The BWP may or may not include an SS/PBCH block (SSB).

A BWP configuration includes, for example, numerology, a frequency location, and a bandwidth (e.g., the number of PRBs). In order to specify the frequency location, common PRB indexing is used at least for a downlink (DL) BWP configuration in a Radio Resource Control (RRC) connected state. Specifically, an offset from PRB 0 to the lowest PRB of the SS/PBCH block to be accessed by a UE is configured by higher layer signaling. The reference point "PRB 0" is common to all the UEs that share the same wideband component carrier.

One SS/PBCH block includes primary signals necessary for an idle UE, such as NR synchronization signals (NR-SS) and an NR physical broadcast channel (NR-PBCH). The NR-SS is used by the UE for DL synchronization. A Reference Signal (RS) is transmitted in the SS/PBCH block to enable an idle UE to perform Radio Resource Management (RRM) measurement (e.g., RSRP measurement). This RS may be the NR-SS itself or may be an additional RS. The NR-PBCH broadcasts part of the minimum System Information (SI), for example a Master Information Block (MIB). The remaining minimum SI (e.g., System Information Block Type1 (SIB1) or remaining minimum SI (RMSI)) is transmitted on a Physical Downlink Shared Channel (PDSCH).

A network can transmit multiple SS/PBCH blocks within the channel bandwidth of one wideband component carrier. In other words, SS/PBCH blocks may be transmitted in a plurality of BWPs within the channel bandwidth. In a first scheme, all the SS/PBCH blocks within one broadband carrier are based on NR-SS (e.g., a primary SS (PSS) and a secondary SS (SSS)) corresponding to the same physical-layer cell identity. In a second scheme, different SS/PBCH blocks within one broadband carrier may be based on NR-SS corresponding to different physical-layer cell identities.

From a UE perspective, a cell is associated with one SS/PBCH block. Therefore, for UEs, each serving cell has a single associated SS/PBCH block in frequency domain. Note that, each serving cell is a primary cell (PCell) in carrier aggregation (CA) and dual connectivity (DC), a primary secondary cell (PSCell) in DC, or a secondary cell (SCell) in CA and DC. Such an SS/PBCH block is referred to as, for example, a cell defining SS/PBCH block. The Cell defining SS/PBCH block has an associated SIB1 (or RMSI). The Cell defining SS/PBCH block is used as the time reference or the timing reference of the serving cell.

One or more BWP configurations for each component carrier are semi-statically signaled to the UE. To be specific, for each UE-specific serving cell, one or more DL BWPs (e.g., up to four DL BWPs) and one or more UL BWPs (e.g., up to four UL BWPs) can be configured for the UE via a dedicated RRC message. One or more DL BWPs and one or more UL BWPs configured for the UE are referred to as a "DL BWP set" and a "UL BWP set", respectively.

Each of the one or more BWPs (i.e., BWP set) configured for the UE can be activated and deactivated. The activated BWP is referred to as active BWP. Specifically, the UE receives signals on one or more active DL BWPs in the configured DL BWP set at a given time. Likewise, the UE transmits signals on one or more active UL BWPs in the configured UL BWP set at a given time. In the current specification, only one DL BWP and only one UL BWP are activated at a given time.

Activation/deactivation of a BWP may be determined by a lower layer (e.g., a Physical (PHY) layer or a Medium Access Control (MAC) layer), rather than by the RRC layer. Switching of the Active BWP is performed by, for example, Downlink Control Information (DCI) (e.g., scheduling DCI) transmitted on an NR Physical Downlink Control Channel (PDCCH). In other words, deactivation of a current active BWP and activation of a new active BWP may be performed by the DCI in the NR PDCCH. The network can activate/deactivate a BWP depending, for example, on a data rate, or on numerology required by a service, and can thereby dynamically switch the active BWP for the UE.

A BWP (i.e., initial active BWP) where the UE initially stays when the UE accesses a serving cell (i.e., when the UE transitions from Idle mode to Connected mode) is referred to as an "initial BWP". The initial BWP includes at least a DL BWP and may include a UL BWP (when an uplink is configured for the serving cell). The initial BWP may also be referred to as a default BWP, a reference BWP, a primary BWP, an anchor BWP, or a master BWP. The BWP set configured for the UE always includes the initial BWP.

The initial BWP is always configured with a Common Search Space. BWPs other than the initial BWP may or may not be configured with a Common Search Space. A Search Space is a subset of resources (i.e., PDCCH Search Space) in which the UE performs blind decoding to find PDCCH data (i.e., DCI). In the 5G system, like in the LTE, the PDCCH Search Space includes a Common Search Space and a UE-specific Search Space. The UE-specific search space is configured individually for each UE via RRC signaling.

Next, the radio frame configuration of 5G NR will be described. In the 5G NR radio frame configuration, one radio frame having 10 milliseconds (ms) duration consists of 10 1-ms subframes regardless of numerology. However, for different numerologies (e.g., subcarrier spacings (SCSs)), different numbers of slots are arranged within one subframe. Specifically, in 15 kHz subcarrier spacing (i.e., subcarrier spacing configuration 0), one subframe includes only one slot. The number of OFDM symbols in one slot is 14. On the other hand, in 30 kHz subcarrier spacing (i.e., subcarrier spacing configuration 1), one subframe includes two 0.5 ms slots. Further, one subframe includes four 0.25 ms slots in 60 kHz subcarrier spacing (i.e., subcarrier spacing configuration 2), eight 0.125 ms slots in 120 kHz subcarrier spacing (i.e., subcarrier spacing configuration 3), and sixteen 0.0625 ms slots in 240 kHz subcarrier spacing (i.e., subcarrier spacing configuration 4).

Further, in 5G NR, besides slot-based scheduling, non-slot-based scheduling may be used. In Slot-based scheduling, the allocation of time domain resources to the UE is performed in units of a slot. On the other hand, non-slot-based scheduling enables allocation of time domain resources to the UE in a time unit finer than one slot. The minimum scheduling unit of non-slot-based scheduling is called a mini-slot, the length of which is 2, 4, or 7 OFDM symbols.

Next, in the following, data formats of downlink control information (DCI) for radio resource scheduling in 5G NR will be described. One of the main objects of the DCI is to notify the UE of scheduling of a Physical Uplink Shared Channel (PUSCH)) and scheduling of a Physical Downlink Shared Channel (PDSCH)). DCI Format 0_0 and DCI Format 0_1 are used for PUSCH scheduling in one cell. Meanwhile, DCI Format 1_0 and DCI Format 1_1 are used for PDSCH scheduling in one cell.

Each of these scheduling DCIs includes a frequency domain resource assignment field and a time domain resource assignment field. The frequency domain resource assignment field and the time domain resource assignment field respectively indicate frequency domain resources and time domain resources allocated to the UE. The maximum size of the frequency domain resource assignment field is 16 bits, while the maximum size of the time domain resource assignment field is 4 bits. The details of the formats of DCIs for scheduling of PUSCH and PDSCH are described, for example, in Section 7.3.1 of Non-Patent Literature 1. The details of resource allocation of PDSCH in frequency domain and time domain are described, for example, in Section 5.1.2 of Non-Patent Literature 2. The details of resource allocation of PUSCH in frequency domain and time domain are described, for example, in Section 6.1.2 of Non-Patent Literature 2.

CITATION LIST

Non Patent Literature

[Non-Patent Literature 1] 3GPP TS 38.212 V15.2.0 (2018-06), "3rd Generation Partnership Project; Technical Specification Group Radio Access Network; NR; Multiplexing and channel coding (Release 15)", June 2018

[Non-Patent Literature 2] 3GPP TS 38.214 V15.2.0 (2018-06), "3rd Generation Partnership Project; Technical Specification Group Radio Access Network; NR; Physical layer procedures for data (Release 15)", June 2018

SUMMARY OF INVENTION

Technical Problem

As discussed above, in the current 3GPP specifications, the maximum size of the time domain resource assignment field of the scheduling DCI is 4 bits (see, for example, Section 7.3.1 of Non-Patent Literature 1). Therefore, the scheduling DCI is able to indicate one of at most 16 time domain resource assignment patterns (see, for example, Sections 5.1.2.1 and 6.1.2.1 of Non-Patent Literature 2). Specifically, the time domain resource assignment field value m provides a row index m+1 pointing to a time domain allocation table. The time domain allocation table has up to 16 rows and these rows define resource assignment patterns different from one another. The UE uses a predefined default table or a table configured by a higher layer (e.g., pdsch-AllocationList and pusch-AllocationList). Having been configured by RRC signaling (e.g., PDSCH-ConfigCommon and PUSCH-Config Common), the UE overwrites the values of the default table with the corresponding values provided by the RRC signaling.

However, as discussed above, 5G NR supports various SCSs and various slot lengths corresponding to these SCSs, and further supports non-slot-based scheduling, thereby having high flexibility in time domain. In addition, 5G NR supports a multibeam operation to overcome reduction in coverage which is due to large propagation loss in higher frequency bands (e.g., over 6 GHz). In the multibeam operation, a base station covers a spatial area using multiple high-directional beams. The base station sweeps multiple high-directional beams, and at a given time instance, transmits or receives data using one of the multiple beams. Thus, while the multibeam operation facilitates user multiplexing in frequency domain, it may need more flexibility in user multiplexing in time domain. Accordingly, in view of the above points, a maximum of 16 time domain assignment patterns may be insufficient for time domain scheduling of 5G NR.

For example, increasing the maximum size of the time domain resource assignment field of the scheduling DCI allows the time domain assignment patterns to be increased, which can improve flexibility in time domain scheduling. However, an increase in the DCI payload size causes a decrease in link budget. Further, this also causes an increase in the variations of the DCI payload size and thus an increase in the number of times of attempts for DCI blind decoding, which may lead to an increase in UE power consumption and a delay in data reception/transmission.

One of the objects to be attained by embodiments disclosed herein is to provide apparatuses, methods, and programs that contribute to improving flexibility in time domain resource assignment (or user multiplexing in time domain) without increasing the size of downlink control information (e.g., scheduling DCI) that indicates radio resources allocated to a radio terminal. It should be noted that this object is merely one of the objects to be attained by the embodiments disclosed herein. Other objects or problems and novel features will be made apparent from the following description and the accompanying drawings.

Solution to Problem

In a first aspect, a base station includes at least one memory and at least one processor coupled to the at least one memory. The at least one processor is configured to transmit, to a radio terminal, downlink control information (DCI) including a first field for indicating frequency domain resources allocated to the radio terminal and a second field for indicating time domain resources allocated to the radio terminal. The at least one processor is further configured to reduce a size of the first field as a size of the second field increases.

In a second aspect, a radio terminal includes at least one memory and at least one processor coupled to the at least one memory. The at least one processor is configured to receive, from a base station, downlink control information (DCI) including a first field for indicating frequency domain resources allocated to the radio terminal and a second field for indicating time domain resources allocated to the radio terminal. The at least one processor is further configured to identify a size of the second field for indicating the time domain resources based on at least one of:
  subcarrier spacing of Synchronisation Signals/Physical Broadcast Channel (SS/PBCH) blocks associated with a cell in which the base station communicates with the radio terminal;
  a time domain transmission pattern of the SS/PBCH blocks;
  a frequency range to which the SS/PBCH blocks belong;
  a number of reference signals used for measuring a quality of multiple beams transmitted in the cell; or
  a parameter regarding a frequency range to which the frequency domain resources belong.

In a third aspect, a method in a base station includes: (a) transmitting, to a radio terminal, downlink control information (DCI) including a first field for indicating frequency domain resources allocated to the radio terminal and a second field for indicating time domain resources allocated to the radio terminal; and (b) reducing a size of the first field as a size of the second field increases.

In a fourth aspect, a method in a radio terminal includes: (a) receiving, from a base station, downlink control information (DCI) including a first field for indicating frequency domain resources allocated to the radio terminal and a second field for indicating time domain resources allocated to the radio terminal; and (b) identifying a size of the second field for indicating the time domain resources based on at least one of:
  subcarrier spacing of Synchronisation Signals/Physical Broadcast Channel (SS/PBCH) blocks associated with a cell in which the base station communicates with the radio terminal;
  a time domain transmission pattern of the SS/PBCH blocks;
  a frequency range to which the SS/PBCH blocks belong;
  a number of reference signals used for measuring a quality of multiple beams transmitted in the cell; or
  a parameter regarding a frequency range to which the frequency domain resources belong.

In a fifth aspect, a program includes instructions (software codes) that, when loaded into a computer, cause the computer to perform the method according to the above-described third or fourth aspect.

Advantageous Effects of Invention

According to the above-deceived aspects, it is possible to provide apparatuses, a methods, and a programs that contribute to improving flexibility in time domain resource assignment (or user multiplexing in time domain) without increasing the size of downlink control information (e.g., scheduling DCI) that indicates radio resources allocated to a radio terminal.

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

Each of the embodiments described below may be used individually or two or more of the embodiments may be appropriately combined with one another. These embodiments include novel features different from each other. Accordingly, these embodiments contribute to attaining objects or solving problems different from one another and contribute to obtaining advantages different from one another.

The following descriptions on the embodiments mainly focus on the 3GPP 5G system. However, these embodiments may also be applied to other radio communication systems.

First Embodiment

Figure 1:
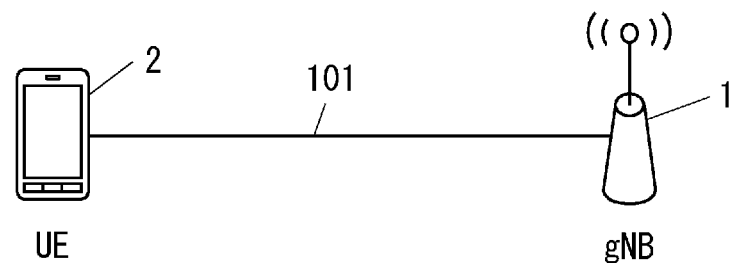
FIG. 1 is a diagram showing a configuration example of a radio communication network according to embodiments.

FIG. 1 shows a configuration example of a radio communication network according to several embodiments including this embodiment. In the example shown in FIG. 1, the radio communication network includes a base station (i.e., gNB) 1 and a radio terminal (i.e., UE) 2. The gNB 1 may either be a gNB Central Unit (gNB-CU) or a gNB Distributed Unit (gNB-DU) in the cloud RAN (C-RAN) deployment.

The UE 2 is connected to the base station 1 through an air interface 101. The UE 2 may be simultaneously connected to a plurality of base stations (i.e., Master gNB (MgNB) and Secondary gNB (SeNB)) for dual connectivity. The UE 2 in connected mode can be semi-statically configured with one or multiple BWPs per cell. The UE 2 can switch its active BWP, used for communication with the gNB 1 (e.g., MgNB) or another gNB (e.g., SgNB), among the configured BWPs. This switching is done in a short time scale, e.g., several scheduling intervals.

Figure 2:
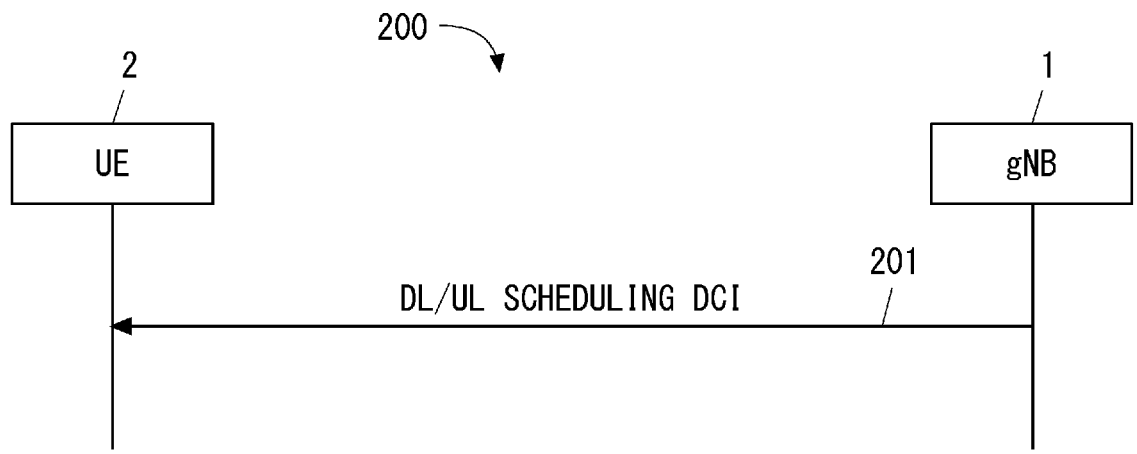
FIG. 2 is a sequence diagram showing one example of operations of a base station and a radio terminal according to a first embodiment.

FIG. 2 is a sequence diagram showing a process 200 that is an example of operations performed by the gNB 1 and the UE 2 according to this embodiment. In Step 201, the gNB 1 transmits, to the UE 2, downlink control information (i.e., scheduling DCI) for radio resource assignment of PUSCH or PDSCH. The scheduling DCI may be DCI Format 0_0, DCI Format 0_1, DCI Format 1_0, or DCI Format 1_1. The scheduling DCI includes a frequency domain resource assignment field and a time domain resource assignment field. The frequency domain resource assignment field indicates frequency domain resources (e.g., Physical Resource Blocks (PRBs) or one or more Resource Block Groups (RBGs)) allocated to the UE 2. Meanwhile, the time domain resource assignment field indicates the time domain resources (e.g., symbols or one or more slots) allocated to the UE 2.

Although it is not shown in FIG. 2, the gNB 1 receives an uplink signal (i.e., PUSCH) from the UE 2 or transmits a downlink signal (i.e., PDSCH) to the UE 2, using the frequency domain resources or the time domain resources indicated by the scheduling DCI. Likewise, the UE 2 transmits an uplink signal (i.e., PUSCH) to the gNB 1 or receives a downlink signal (i.e., PDSCH) from the gNB 1, using the frequency domain resources or the time domain resources indicated by the scheduling DCI.

Both the size of the frequency domain resource assignment field and the size of the time domain resource assignment field of the scheduling DCI can be changed. The gNB 1 according to this embodiment determines the size (or bit length) of the frequency domain resource assignment field depending on the size (or bit length) of the time domain resource assignment field. Specifically, the gNB 1 reduces the size of the frequency domain resource assignment field as it increases the size of the time domain resource assignment field. More specifically, the gNB 1 may reduce the size of the frequency domain resource assignment field by the number of bits the same as the number of increased bits of the time domain resource assignment field. Accordingly, the gNB 1 can maintain the maximum total size of the frequency domain resource assignment fields and the time domain resource assignment fields constant.

Figure 3:
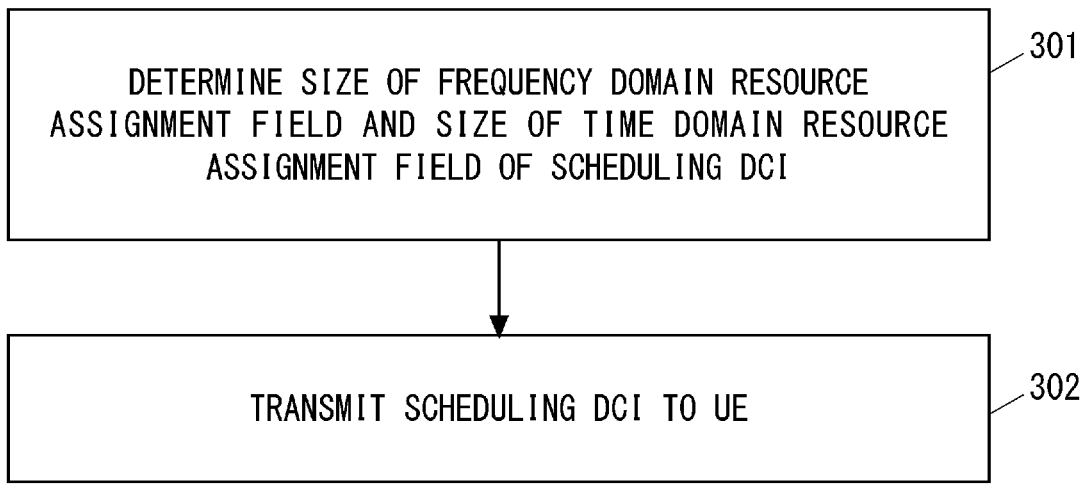
FIG. 3 is a flowchart showing one example of operations of a base station according to the first embodiment.

FIG. 3 is a flowchart showing one example of operations of the gNB 1 according to this embodiment. In Step 301, the gNB 1 determines the size of the frequency domain resource assignment field and the size of the time domain resource assignment field of the scheduling DCI to be sent to the UE 2. As described above, the gNB 1 determines the size (or bit length) of the frequency domain resource assignment field depending on the size (or bit length) of the time domain resource assignment field. In Step 302, the gNB 1 generates the scheduling DCI in accordance with the determined sizes of these fields and transmits the generated scheduling DCI to the UE 2.

In some implementations, the gNB 1 may transmit to the UE 2, via explicit signaling, information for determining the size of the frequency domain resource assignment field and the size of the time domain resource assignment field of the scheduling DCI at the UE 2. Specifically, the gNB 1 may provide the UE 2 with a time domain allocation table having 17 or more rows, through RRC signaling (e.g., PDSCH-ConfigCommon and PUSCH-Config Common). In this case, the UE 2 may identify that the size of the time domain resource assignment field is five or more bits based on the fact that the time domain allocation table having 17 or more rows has been configured.

Alternatively, in some implementations, the UE 2 may identify the size of the time domain resource assignment field (and the size of the frequency domain resource assignment field) based on another parameter that has been configured in (or measured by) the UE 2, without using explicit signaling from the gNB 1. For example, a plurality of default time domain allocation tables, including at least one table having 17 or more rows, may be predefined, and a rule that defines how to use these tables may also be predefined. In this case, the UE 2 may select one of the tables to be used based on a predetermined parameter, and then identify the size of the time domain resource assignment field based on the number of the rows of the selected table.

According to this embodiment, the gNB 1 reduces the size of the frequency domain resource assignment field of scheduling DCI as the gNB 1 increases the size of the time domain resource assignment field of this scheduling DC. This allows the gNB 1 to improve flexibility in time domain resource assignment (or user multiplexing in time domain) without increasing the payload size of the scheduling DCI.

Second Embodiment

This embodiment provides several specific examples of a change in the size of the time domain resource assignment field of scheduling DCI. The configuration example of a radio communication network according to this embodiment is the same as that shown in FIG. 1.

The gNB 1 may change (or determine) the size of the time domain resource assignment field of scheduling DCI to be sent to the UE 2 based on at least one of the following parameters:
  subcarrier spacing (SCS) of SS/PBCH blocks associated with a cell in which the gNB 1 communicates with the UE 2;
  a time domain transmission pattern of these SS/PBCH blocks;
  a frequency range to which the SS/PBCH blocks belong; or
  the number of reference signals used for measuring a quality of beams transmitted in the cell (e.g., Channel State Information Reference Signals (CSR-RSs)).

Likewise, the UE 2 may identify the size of the time domain resource assignment field of the scheduling DCI received from the gNB 1 based on at least one of the above parameters.

Specifically, in some implementations, when the SCS of the SS/PBCH blocks has a first value (e.g., 30 kHz) or smaller, the gNB 1 may use an existing default time domain allocation table (i.e., a table having 16 rows) and set the size of the time domain resource assignment field of the scheduling DCI to be 4 bits. When the SCS of the SS/PBCH blocks has the first value (e.g., 30 kHz) or smaller and the UE 2 has not been configured with another table by RRC signaling, the UE 2 may use the existing default table and identify that the size of the time domain resource assignment field of the scheduling DCI is 4 bits.

On the other hand, when the SCS of the SS/PBCH blocks has a second value (e.g., 120 kHz) or larger, the gNB 1 may use an extended default time domain allocation table having 17 or more rows and set the size of the time domain resource assignment field of the scheduling DCI to be 5 bits or more. When the SCS of the SS/PBCH blocks has the second value (e.g., 120 kHz) or larger and the UE 2 has not been configured with another table by RRC signaling, the UE 2 may use the extended default table and identify that the size of the time domain resource assignment field of the scheduling DCI is 5 bits or more.

The time domain transmission pattern of the SS/PBCH blocks defines arrangement of the SS/PBCH blocks in an SS burst set (5 ms) in which the SS/PBCH blocks are transmitted. In one example, the time domain transmission pattern of the SS/PBCH blocks may be the number (L) of the candidate SS/PBCH block locations within the SS burst set (5 ms). This value L depends on the carrier frequency range to which the SS/PBCH blocks belong. Specifically, L=4 in the case of the carrier frequency of 3 GHz (2.4 GHz in the case of unpaired spectrum (TDD)) or lower, L=8 in the case of the carrier frequency higher than 3 GHz (or 2.4 GHz in the case of unpaired spectrum (TDD)) and up to 6 GHz, and L=64 in the case of carrier frequency higher than 6 GHz. In another example, the time domain transmission pattern of the SS/PBCH blocks may be the number of locations that are actually used (or configured) of the candidate SS/PBCH block locations in the SS burst set. This number is indicated by "ssb-PositionsInBurst", which is an RRC parameter sent to the UE 2 via System Information Block Type1 (SIB1) or dedicated RRC signaling (i.e., ServingCellConfigCommon).

In some implementations, when the number (L) of the candidate SS/PBCH block locations in the SS burst set (5 ms) is a first value (e.g., 8) or smaller, the gNB 1 may use an existing default time domain allocation table (i.e., a table having 16 rows) and set the size of the time domain resource assignment field of the scheduling DCI to be 4 bits. When the number (L) of the candidate SS/PBCH block locations in the SS burst set (5 ms) is the first value (e.g., 8) or smaller and the UE 2 has not been configured with another table by RRC signaling, the UE 2 may use the existing default table and identify that the size of the time domain resource assignment field of the scheduling DCI is 4 bits.

On the other hand, when the number (L) of the candidate SS/PBCH block locations in the SS burst set (5 ms) is the second value (e.g., 64) or larger, the gNB 1 may use an extended default time domain allocation table having 17 or more rows and set the size of the time domain resource assignment field of the scheduling DCI to be 5 bits or more. When the number (L) of the candidate SS/PBCH block locations in the SS burst set (5 ms) is the second value (e.g., 64) or larger and the UE 2 has not been configured with another table by RRC signaling, the UE 2 may use the extended default table and identify that the size of the time domain resource assignment field of the scheduling DCI is 5 bits or more.

Alternatively, when the number of SS/PBCH block locations that are actually used in the SS burst set is a specific value (e.g., 16) or smaller, the gNB 1 may use an existing default time domain allocation table (i.e., a table having 16 rows) and set the size of the time domain resource assignment field of the scheduling DCI to be 4 bits. When the number of SS/PBCH block locations that are actually used in the SS burst set is the first value (e.g., 16) or smaller and the UE 2 has not been configured with another table by RRC signaling, the UE 2 may use the existing default table and identify that the size of the time domain resource assignment field of the scheduling DCI is 4 bits.

On the other hand, when the number of SS/PBCH block locations that are actually used in the SS burst set exceeds a specific value (e.g., 16), the gNB 1 may use an extended default time domain allocation table having 17 or more rows and set the size of the time domain resource assignment field of the scheduling DCI to be 5 bits or more. When the number of SS/PBCH block locations that are actually used in the SS burst set exceeds a specific value (e.g., 16) and the UE 2 has not been configured with another table by RRC signaling, the UE 2 may use the extended default table and identify that the size of the time domain resource assignment field of the scheduling DCI is 5 bits or more.

In some implementations, when the carrier frequency in which the SS/PBCH blocks are transmitted is a specific value (e.g., 6 GHz) or lower, the gNB 1 may use an existing default time domain allocation table (i.e., a table having 16 rows) and set the size of the time domain resource assignment field of the scheduling DCI to be 4 bits. When the carrier frequency in which the SS/PBCH blocks are transmitted is a specific value (e.g., 6 GHz) or lower and the UE 4 has not been configured with another table by RRC signaling, the UE 2 may use the existing default table and identify that the size of the time domain resource assignment field of the scheduling DCI is 4 bits.

On the other hand, when the carrier frequency in which the SS/PBCH blocks are transmitted exceeds a specific value (e.g., 6 GHz), the gNB 1 may use an extended default time domain allocation table having 17 or more rows and set the size of the time domain resource assignment field of the scheduling DCI to be 5 bits or more. When the carrier frequency in which the SS/PBCH blocks are transmitted exceeds a specific value (e.g., 6 GHz) and the UE 2 has not been configured with another table by RRC signaling, the UE 2 may use the extended default table and identify that the size of the time domain resource assignment field of the scheduling DCI is 5 bits or more.

In some implementations, when the number of reference signals (e.g., CSR-RSs) used for measuring a quality of beams is a specific value (e.g., 16) or smaller, the gNB 1 may use an existing default time domain allocation table (i.e., a table having 16 rows) and set the size of the time domain resource assignment field of the scheduling DCI to be 4 bits. When the number of reference signals (e.g., CSR-RSs) used for measuring a quality of beams is a specific value (e.g., 16) or smaller and the UE 2 has not been configured with another table by RRC signaling, the UE 2 may use the existing default table and identify that the size of the time domain resource assignment field of the scheduling DCI is 4 bits.

On the other hand, when the number of reference signals (e.g., CSR-RSs) for the beam quality measurement exceeds a specific value (e.g., 16), the gNB 1 may use an extended default time domain allocation table having 17 or more rows and set the size of the time domain resource assignment field of the scheduling DCI to be 5 bits or more. When the number of reference signals (e.g., CSR-RSs) for the beam quality measurement exceeds a specific value (e.g., 16) and the UE 2 has not been configured with another table by RRC signaling, the UE 2 may use the extended default table and identify that the size of the time domain resource assignment field of the scheduling DCI is 5 bits or more.

The gNB 1 may provide the UE 2 with a threshold for a parameter (e.g., the number of reference signals for beam quality measurement) used to change (or identify) the size of the time domain resource assignment field. This threshold may be sent from the gNB 1 to the UE 2 via broadcast information (e.g., SIB) or RRC signaling (e.g., scellConfigCommon).

It should be noted that the aforementioned parameters, i.e., the SCS of the SS/PBCH blocks, the time domain transmission pattern of the SS/PBCH blocks, the frequency range to which the SS/PBCH blocks belong, and the number of reference signals used for measuring a quality of beams, are parameters regarding the multibeam operation. Specifically, the fact that the SCS of the SS/PBCH blocks is large suggests, directly or indirectly, that a multibeam operation involving a sweep of multiple high-directional beams is being conducted. Likewise, the facts that the number of candidate SS/PBCH block locations in the SS burst is large, the number of SS/PBCH block locations that are actually used (or set) is large, the carrier frequency in which the SS/PBCH blocks are transmitted is high, and the number of reference signals for beam quality measurement is large suggest the same directly or indirectly.

As already described above, in the multibeam operation, the base station sweeps multiple high-directional beams and at a given time instance, transmits or receives data using one of these multiple beams. Therefore, while the multibeam operation facilitates user multiplexing in frequency domain, it may need more flexibility in user multiplexing in time domain. In such a situation, in which the multibeam operation is performed, the operations of the gNB 1 and the UE 2 according to this embodiment are able to improve flexibility in time domain resource assignment (or user multiplexing in time domain) while limiting flexibility in frequency domain resource assignment (or user multiplexing in frequency domain).

Figure 4:
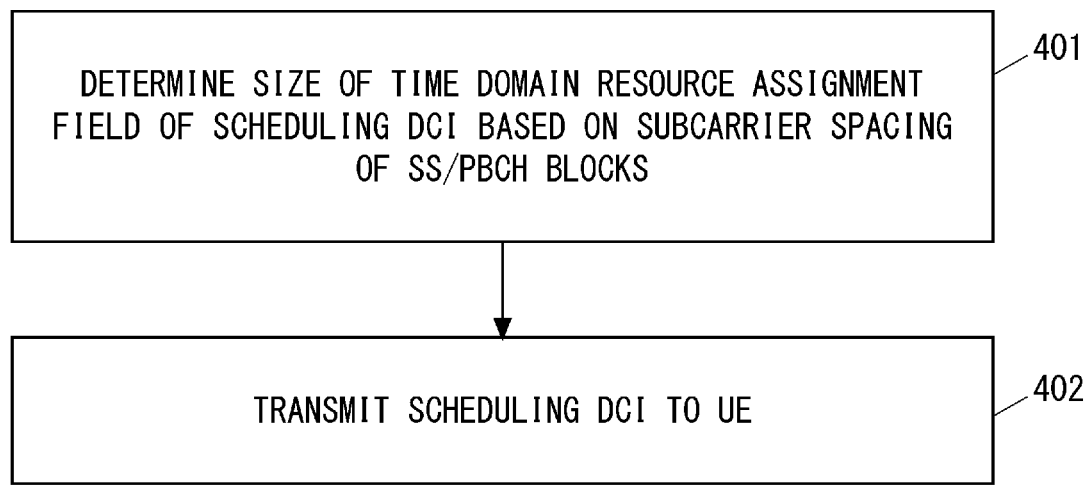
FIG. 4 is a flowchart showing one example of operations of a base station according to a second embodiment.

FIG. 4 is a flowchart showing one example of operations of the gNB 1 according to this embodiment. In Step 401, the gNB 1 determines the size of the time domain resource assignment field of the scheduling DCI based on the SCS of the SS/PBCH blocks associated with the cell in which the gNB 1 communicates with the UE 2. As already described above, the gNB 1 may use other parameters to determine the size of the time domain resource assignment field in combination with or in place of the SCS of the SS/PBCH blocks. In Step 402, the gNB 1 transmits the scheduling DCI to the UE 2.

Figure 5:
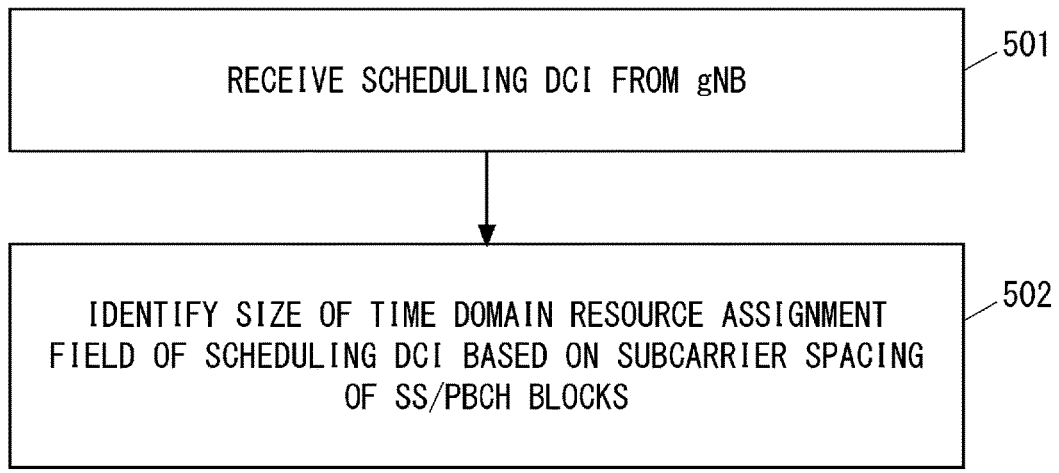
FIG. 5 is a flowchart showing one example of operations of a radio terminal according to the second embodiment.

FIG. 5 is a flowchart showing one example of operations of the UE 2 according to this embodiment. In Step 501, the UE 2 receives the scheduling DCI from the gNB 1. In Step 502, the UE 2 identifies the size of the time domain resource assignment field of the scheduling DCI based on the SCS of the SS/PBCH blocks associated with the cell in which the UE 2 communicates with the gNB 1. As already described above, the UE 2 may use other parameters to identify the size of the time domain resource assignment field in combination with or in place of the SCS of the SS/PBCH blocks.

Third Embodiment

This embodiment provides some specific examples of a change in the size of the time domain resource assignment field of scheduling DCI. The configuration example of a radio communication network according to this embodiment is the same as that shown in FIG. 1.

The above-described second embodiment provides the examples, in which the gNB 1 changes (or determines) the size of the time domain resource assignment field of the scheduling DCI based on parameters regarding the multibeam operation. Alternatively, the gNB 1 may change (or determine) the size of the time domain resource assignment field based directly on the number of multiple beams transmitted in the cell in which the gNB 1 communicates with the UE 2. This operation of the gNB 1 is able to improve flexibility in time domain resource assignment (or user multiplexing in time domain) while limiting flexibility in frequency domain resource assignment (or user multiplexing in frequency domain), in a situation in which the multibeam operation is performed.

Fourth Embodiment

This embodiment provides some specific examples of a change in the size of the time domain resource assignment field of the scheduling DCI. The configuration example of a radio communication network according to this embodiment is the same as that shown in FIG. 1.

The gNB 1 may change (or determine) the size of the time domain resource assignment field of the scheduling DCI based on a parameter regarding the frequency range to which frequency domain resources allocated to the UE 2 (i.e., frequency resources of PUSCH or PDSCH) belong. The gNB 1 may take into account, for example, the BWP to which the frequency resources allocated to the UE 2 belong.

More specifically, when the gNB 1 allocates frequency resources in a BWP over 6 GHz to the UE 2, the gNB 1 may use an extended default time domain allocation table having 17 or more rows and set the size of the time domain resource assignment field of the scheduling DCI to be 5 bits or more. When the UE 2 has been allocated frequency resources in a BWP over 6 GHz and the UE 2 has not been configured with another table by RRC signaling, the UE 2 may use the extended default table and identify that the size of the time domain resource assignment field of the scheduling DCI is 5 bits or more.

For example, the UE 2 may check a "Bandwidth part indicator" field contained in DCI format 0_1 or DCI format 1. This Bandwidth part indicator field indicates a BWP to which the frequency resources allocated to the UE 2 belong. Furthermore or alternatively, the UE 2 may check a "Carrier indicator" field contained in DCI format 0_1 or DCI format 1. The "Carrier indicator" field, which is used for cross-carrier scheduling, shows another servicing cell (i.e., SCell) to which a grant (i.e., resource assignment) indicated by the scheduling DCI is applied.

In a component carrier or BWP in a higher frequency band (e.g., over 6 GHz), a wider SCS (e.g., 120 kHz or more) and a shorter slot length (e.g., 0.125 ms or less) are used. The operations of the gNB 1 and the UE 2 according to this embodiment are able to improve flexibility in time domain resource assignment (or user multiplexing in time domain) for the component carrier or BWP in such higher frequency band (e.g., over 6 GHz).

Fifth Embodiment

This embodiment provides specific examples of a method of limiting flexibility in frequency domain resource assignment (i.e., reducing the size of the frequency domain resource assignment field in the scheduling DCI). The configuration example of a radio communication network according to this embodiment is the same as that shown in FIG. 1.

5G NR defines two types of downlink resource allocation methods called type 0 and type 1. Likewise, 5G NR defines two types of uplink resource allocation methods called type 0 and type 1. In the downlink and uplink resource allocation of type 0, the frequency domain resource assignment field of the scheduling DCI includes a bit map indicating Resource Block Groups (RBGs) allocated to the scheduled UE. A RBG is a set of consecutive virtual resource blocks. On the other hand, in the downlink and uplink resource allocation of type 1, the frequency domain resource assignment field of the scheduling DCI consists of a resource indication value (RIV) indicating the location of a starting virtual resource block and the length in terms of contiguously allocated resource blocks.

Figure 6A:
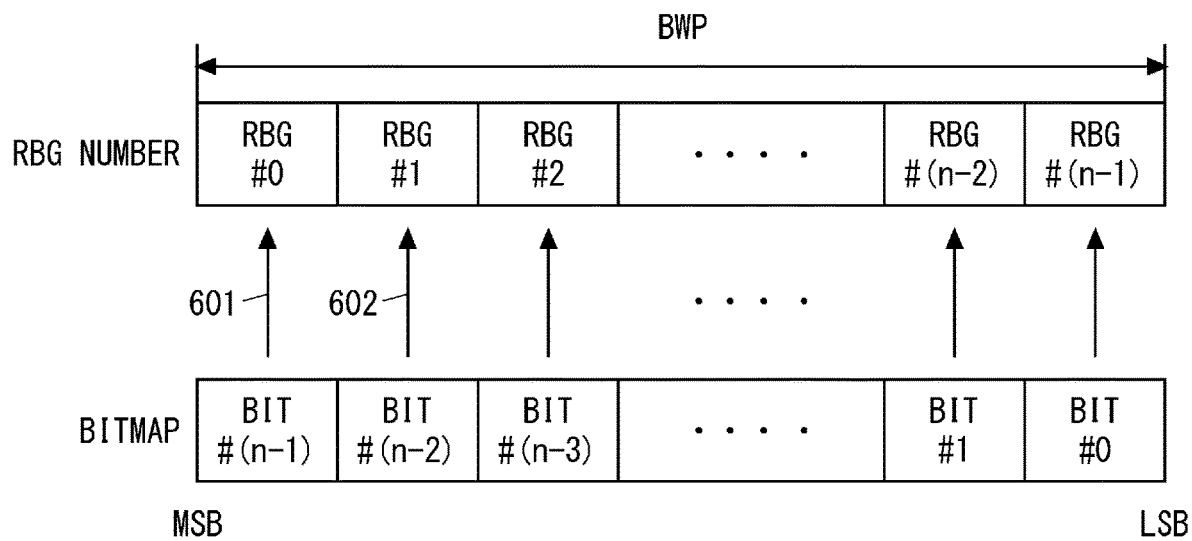
FIG. 6A is a diagram showing one example of frequency domain resource assignment in 5G NR.

FIG. 6A shows one example of the frequency resource allocation type 0. As shown in FIG. 6A, in the resource allocation type 0, the size of the bit map in the frequency domain resource assignment field is the same as the number of RBGs arranged in the BWP. Each bit in the bit map is associated one-to-one with a corresponding RBG. Specifically, the most significant bit (MSB) of the bit map is associated with RBG #0 having the lowest frequency in the BWP (601) and the second MSB of the bit map is associated with RBG #1 having the second lowest frequency in the BWP (602).

Figure 6B:
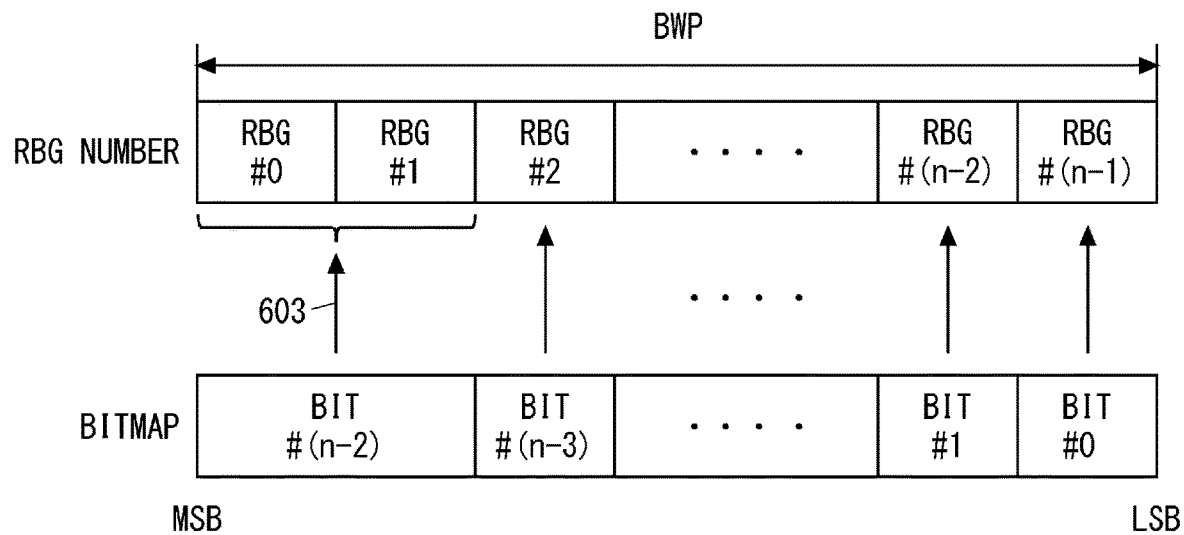
FIG. 6B is a diagram showing one example of frequency domain resource assignment according to a fifth embodiment.

FIG. 6B shows one example of resource allocation type 0 that has been modified to limit flexibility of the frequency domain resource assignment. In the example shown in FIG. 6B, the most significant bit (MSB) of the bit map is associated with RBG #0 and RBG #1 (603). In other words, RBG #0 and RBG #1 are mapped to the most significant bit (MSB) of the bit map. Like in the example shown in FIG. 6A, the remaining RBGs are mapped respectively to the remaining bits in the bit map. Accordingly, the bit map shown in FIG. 6B is shorter than the bit map shown in FIG. 6A by one bit. Put another way, the frequency resource assignment shown in FIG. 6B is able to reduce the size of the frequency domain resource assignment field in the scheduling DCI by one bit from the maximum size.

The size of the time domain resource assignment field may be increased by the same number of bits as the frequency domain resource assignment field decreases. This contributes to increasing the size of the time domain resource assignment field while maintaining the maximum total size of the frequency domain resource assignment fields and the time domain resource assignment fields at a constant size. In the example shown in FIG. 6B, the maximum size of the time domain resource assignment field may be increased by one bit which is reduced from the frequency domain resource assignment field. Accordingly, the maximum size of the time domain resource assignment field becomes 5 bits, and the number of patterns of the time domain resource assignment can be increased up to 32 patterns.

The example shown in FIG. 6B is merely one example and may be changed in various ways. For example, the MSB of the bit map may be associated with three or more RBGs (e.g., RBG #0, RBG #1, and RBG #2) that are located in the lowest frequency end in the BWP. In other words, three or more RBGs that are located in the lowest frequency end in the BWP may be mapped to the MSB of the bit map. Alternatively, the least significant bit (LSB) of the bit map may be associated with two or more RBGs (i.e., RBG #(n−1) and RBG #(n−2)) that are located in the highest frequency end in the BWP. In other words, two or more RBGs located in the highest frequency end in the BWP may be mapped to the LSB of the bit map.

Further, alternatively, any one bit in the bit map may be associated with any two or more RBGs in the BWP. In other words, any two or more RBGs in the BWP may be mapped to any one bit in the bit map. However, mapping some RBGs that are located in the lowest frequency end in the BWP or some RBGs that are located in the highest frequency end in the BWP to one bit in the bit map is more effective for suppressing the decrease in the resource utilization efficiency.

Sixth Embodiment

This embodiment provides a specific example of a method of limiting flexibility in frequency domain resource assignment (i.e., reducing the size of the frequency domain resource assignment field in the scheduling DCI). The configuration example of a radio communication network according to this embodiment is the same as that shown in FIG. 1.

Figure 7:
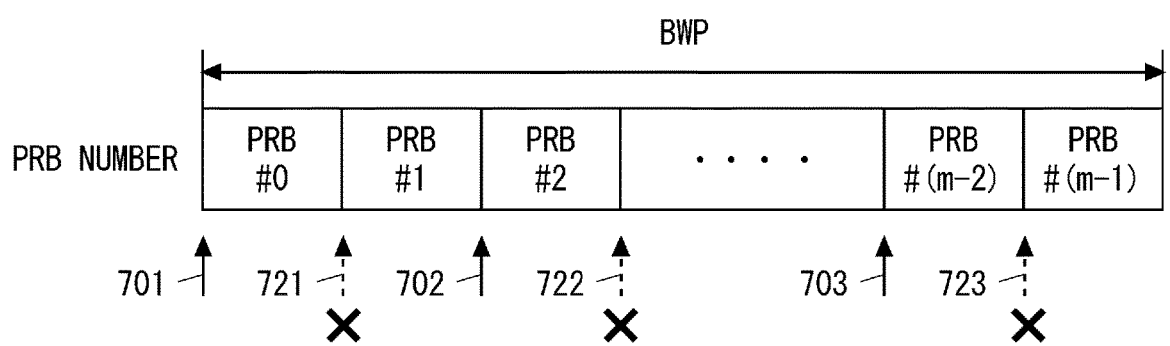
FIG. 7 is a diagram showing one example of frequency domain resource assignment according to a sixth embodiment.

In this embodiment, a modification of the frequency resource allocation type 1 will be described. In order to reduce the size of the frequency domain resource assignment field from its maximum size, the gNB 1 selects the start position of RBs contiguously allocated to the UE 2 from a plurality of non-contiguous location candidates arranged at intervals of at least 2 RBs. FIG. 7 shows one example of resource allocation type 1 that has been modified to limit flexibility in frequency domain resource assignment. In the example shown in FIG. 7, candidates for the start position of RBs contiguously allocated to the UE 2 are limited to even numbered (e.g., #0, #2, . . . ) PRBs (arrows 701-703 in the figure). Thus, the start position of RBs contiguously allocated to the UE 2 is not selected from odd numbered (e.g., #1, #3, . . . ) PRBs (arrows 721-723 in the figure). The frequency resource assignment shown in FIG. 7 contributes to reducing the size of the frequency domain resource assignment field in the scheduling DCI by one bit from the maximum size. Further, by setting the intervals between the candidates for the start position of RBs contiguously allocated to the UE 2 to be 4 RBs or larger, it is possible to contribute to reducing the size of the frequency domain resource assignment field in the scheduling DCI by two or more bits from the maximum size.

Like in the fifth embodiment, the size of the time domain resource assignment field may be increased by the same number of bits as the frequency domain resource assignment field decreases. This contributes to increasing the size of the time domain resource assignment field while maintaining the maximum total size of the frequency domain resource assignment fields and the time domain resource assignment fields at a constant size.

Seventh Embodiment

This embodiment provides a specific example of a method of limiting flexibility of the frequency domain resource assignment (i.e., reducing the size of the frequency domain resource assignment field in the scheduling DCI). The configuration example of a radio communication network according to this embodiment is the same as that shown in FIG. 1.

In this embodiment, a modification of the frequency resource allocation type 0 will be described. In order to reduce the size of the frequency domain resource assignment field from the maximum size, the gNB 1 increases the size of each RBG included in the plurality of RBGs in the BWP by a factor of two or more, thereby reducing the number of the plurality of RBGs by a factor of two or more. This resource assignment contributes to reducing the size of the frequency domain resource assignment field in the scheduling DCI by one or more bits from the maximum size.

Like in the fifth embodiment, the size of the time domain resource assignment field may be increased by the same number of bits as the frequency domain resource assignment field decreases. This contributes to increasing the size of the time domain resource assignment field while maintaining the maximum total size of the frequency domain resource assignment fields and the time domain resource assignment fields at a constant size.

Figure 8:
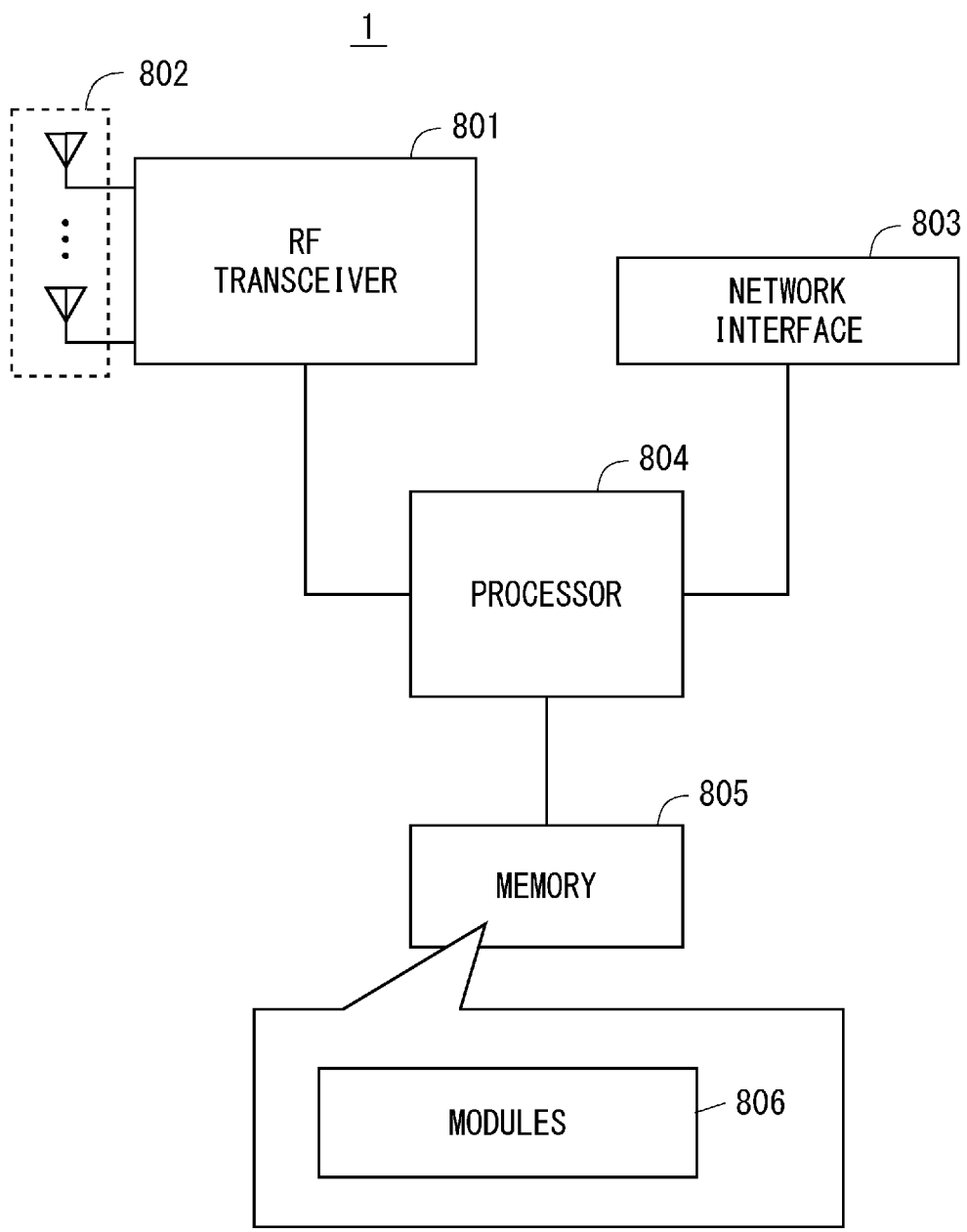
FIG. 8 is a block diagram showing a configuration example of a base station according to embodiments.

The following provides configuration examples of the gNB 1 and the UE 2 according to the above-described embodiments. FIG. 8 is a block diagram showing a configuration example of the gNB 1 according to the above embodiments. Referring to FIG. 8, the gNB 1 includes a Radio Frequency transceiver 801, a network interface 803, a processor 804, and a memory 805. The RF transceiver 801 performs analog RF signal processing to communicate with NG UEs including the UE 2. The RF transceiver 801 may include a plurality of transceivers. The RF transceiver 801 is coupled to an antenna array 802 and the processor 804. The RF transceiver 801 receives modulated symbol data from the processor 804, generates a transmission RF signal, and supplies the transmission RF signal to the antenna array 802. Further, the RF transceiver 801 generates a baseband reception signal based on a reception RF signal received by the antenna array 802 and supplies the baseband reception signal to the processor 804. The RF transceiver 801 may include an analog beamformer circuit for beam forming. The analog beamformer circuit includes, for example, a plurality of phase shifters and a plurality of power amplifiers.

The network interface 803 is used to communicate with network nodes (e.g., a control node and a transfer node of 5G Core). The network interface 803 may include, for example, a network interface card (NIC) conforming to the IEEE 802.3 series.

The processor 804 performs digital baseband signal processing (i.e., data-plane processing) and control-plane processing for radio communication. The processor 804 may include a plurality of processors. The processor 804 may include, for example, a modem processor (e.g., a Digital Signal Processor (DSP)) that performs digital baseband signal processing and a protocol stack processor (e.g., a Central Processing Unit (CPU) or a Micro Processing Unit (MPU)) that performs the control-plane processing. The processor 804 may include a digital beamformer module for beam forming. The digital beamformer module may include a Multiple Input Multiple Output (MIMO) encoder and a pre-coder.

The memory 805 is composed of a combination of a volatile memory and a non-volatile memory. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 805 may include a storage located apart from the processor 804. In this case, the processor 804 may access the memory 805 via the network interface 803 or an I/O interface (not shown).

The memory 805 may store one or more software modules (computer programs) 806 including instructions and data to perform processing by the gNB 1 described in the above embodiments. In some implementations, the processor 804 may be configured to load the software modules 806 from the memory 805 and execute the loaded software modules, thereby performing processing of the gNB 1 described in the above embodiments.

When the gNB 1 is a gNB-CU, the gNB 1 may not include the RF transceiver 801 (and the antenna array 802).

Figure 9:
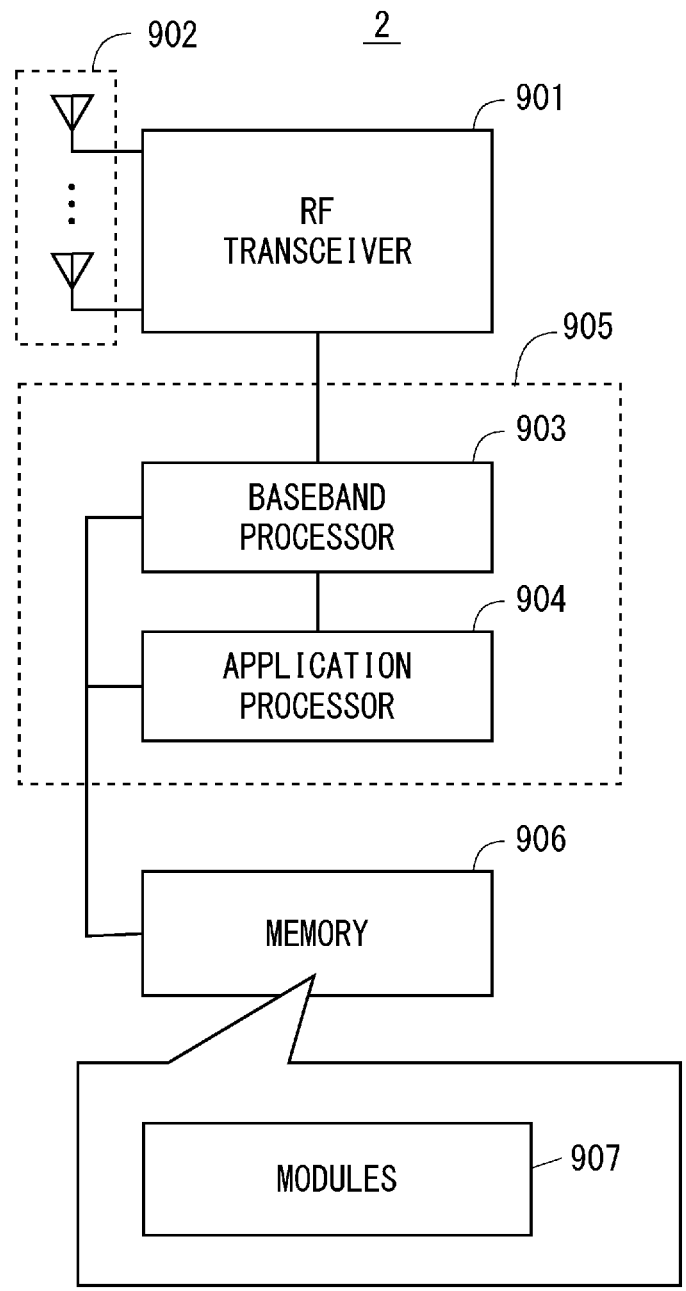
FIG. 9 is a block diagram showing a configuration example of a radio terminal according to embodiments.

FIG. 9 is a block diagram showing a configuration example of the UE 2. A Radio Frequency (RF) transceiver 901 performs analog RF signal processing to communicate with the gNB 1. The RF transceiver 901 may include a plurality of transceivers. The analog RF signal processing performed by the RF transceiver 901 includes frequency up-conversion, frequency down-conversion, and amplification. The RF transceiver 901 is coupled to an antenna array 902 and a baseband processor 903. The RF transceiver 901 receives modulated symbol data (or OFDM symbol data) from the baseband processor 903, generates a transmission RF signal, and supplies the transmission RF signal to the antenna array 902. Further, the RF transceiver 901 generates a baseband reception signal based on a reception RF signal received by the antenna array 902 and supplies the baseband reception signal to the baseband processor 903. The RF transceiver 901 may include an analog beamformer circuit for beam forming. The analog beamformer circuit includes, for example, a plurality of phase shifters and a plurality of power amplifiers.

The baseband processor 903 performs digital baseband signal processing (i.e., data-plane processing) and control-plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

The digital baseband signal processing by the baseband processor 903 may include, for example, signal processing of a Service Data Adaptation Protocol (SDAP) layer, a Packet Data Convergence Protocol (PDCP) layer, a Radio Link Control (RLC) layer, a MAC layer, and a PHY layer. Further, the control-plane processing performed by the baseband processor 903 may include processing of a Non-Access Stratum (NAS) protocol, an RRC protocol, and MAC CEs.

The baseband processor 903 may perform MIMO encoding and pre-coding for beam forming.

The baseband processor 903 may include a modem processor (e.g., DSP) that performs the digital baseband signal processing and a protocol stack processor (e.g., a CPU or an MPU) that performs the control-plane processing. In this case, the protocol stack processor, which performs the control-plane processing, may be integrated with an application processor 904 described in the following.

The application processor 904 is also referred to as a CPU, an MPU, a microprocessor, or a processor core. The application processor 904 may include a plurality of processors (processor cores). The application processor 904 loads a system software program (Operating System (OS)) and various application programs (e.g., a call application, a WEB browser, a mailer, a camera operation application, and a music player application) from a memory 906 or from another memory (not shown) and executes these programs, thereby providing various functions of the UE 2.

In some implementations, as represented by a dashed line (905) in FIG. 9, the baseband processor 903 and the application processor 904 may be integrated on a single chip. In other words, the baseband processor 903 and the application processor 904 may be implemented in a single System on Chip (SoC) device 905. An SoC device may be referred to as a Large Scale Integration (LSI) or a chipset.

The memory 906 is a volatile memory, a non-volatile memory, or a combination thereof. The memory 906 may include a plurality of memory devices that are physically independent from each other. The volatile memory is, for example, an SRAM, a DRAM, or a combination thereof. The non-volatile memory is, for example, an MROM, an EEPROM, a flash memory, a hard disc drive, or any combination thereof. The memory 906 may include, for example, an external memory device that can be accessed from the baseband processor 903, the application processor 904, and the SoC 905. The memory 906 may include an internal memory device that is integrated in the baseband processor 903, the application processor 904, or the SoC 905. Further, the memory 906 may include a memory in a Universal Integrated Circuit Card (UICC).

The memory 906 may store one or more software modules (computer programs) 907 including instructions and data to perform the processing by the UE 2 described in the above embodiments. In some implementations, the baseband processor 903 or the application processor 904 may load these software modules 907 from the memory 906 and execute the loaded software modules, thereby performing the processing of the UE 2 described in the above embodiments with reference to the drawings.

Note that the control-plane processing and operations performed by the UE 2 described in the above embodiments can be achieved by the elements other than the RF transceiver 901 and the antenna array 902, i.e., achieved by at least one of the baseband processor 903 and the application processor 904, and a memory 906 storing the software module 907.

As described above with reference to FIGS. 8 and 9, each of the processors included in the gNB 1 and UE 2 in the above embodiment executes one or more programs including instructions for causing a computer to perform an algorithm described above with reference to the drawings. These programs can be stored and provided to a computer using any type of non-transitory computer readable media. Non-transitory computer readable media include various types of tangible storage media. Examples of the non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM)). The programs may be provided to a computer by using any type of transitory computer readable media. Examples of the transitory computer readable media include electric signals, optical signals, and electromagnetic waves. The transitory computer readable media can provide the program to a computer via a wired communication line (e.g., electric wires and optical fibers) or a wireless communication line.

OTHER EMBODIMENTS

Each of the above-described embodiments may be used individually or two or more embodiments may be appropriately combined with one another.

The UE in the present disclosure is an entity connected to a network via a wireless interface. It should be noted that the UE in the present disclosure is not limited to a dedicated communication device and can be any device as follows having a communication function herein explained.

The terms "User Equipment" or "UE" (as the term is used by 3GPP), "mobile station", "mobile terminal", "mobile device", and "radio terminal" are generally intended to be synonymous with one another. The UE may include standalone mobile stations, such as terminals, cell phones, smart phones, tablets, cellular IoT (internet of things) terminals, and IoT devices. It will be appreciated that the terms "UE" and "radio terminal" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper projecting machinery; chemical machinery; mining and/or construction machinery and/or related equipment; machinery and/or implements for agriculture, forestry and/or fisheries; safety and/or environment preservation equipment; tractors; precision bearings; chains; gears; power transmission equipment; lubricating equipment; valves; pipe fittings; and/or application systems for any of the previously mentioned equipment or machinery etc.).

A UE may, for example, be an item of transport equipment (for example transport equipment such as: rolling stocks; motor vehicles; motorcycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be a refrigerating machine, a refrigerating machine applied product, an item of trade and/or service industry equipment, a vending machine, an automatic service machine, an office machine or equipment, a consumer electronic and electronic appliance (for example a consumer electronic appliance such as: audio equipment; a loud speaker; a radio; video equipment; a television; a microwave oven; a rice cooker; a coffee machine; a dishwasher; a washing machine; a dryer; an electronic fan or related appliance; a cleaner etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to "internet of things (IoT)", using a variety of wired and/or wireless communication technologies. IoT devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a stationary apparatus. IoT devices may also be embedded in non-stationary apparatus (e.g. vehicles) or attached to animals or persons to be monitored/tracked. It will be appreciated that IoT technology can be implemented on any communication devices that can connect to a communications network for sending/receiving data, regardless of whether such communication devices are controlled by human input or software instructions stored in memory. It will be appreciated that IoT devices are sometimes also referred to as Machine-Type Communication (MTC) devices, Machine-to-Machine (M2M) communication devices, or Narrow Band-IoT (NB-IoT) UE.

It will be appreciated that a UE may support one or more IoT or MTC applications.

Some examples of MTC applications are listed in 3GPP TS 22.368 V13.2.0 (2017-01-13), Annex B (the contents of which are incorporated herein by reference). This list is not exhaustive and is intended to be indicative of some examples of MTC applications. In this list, the Service Area of the MTC applications includes Security, Tracking & Tracing, Payment, Health, Remote Maintenance/Control, Metering, and Consumer Devices.

Examples of the MTC applications regarding Security include Surveillance systems, Backup for landline, Control of physical access (e.g. to buildings), and Car/driver security.

Examples of the MTC applications regarding Tacking & Tracing include Fleet Management, Order Management, Telematics insurance: Pay as you drive (PAYD), Asset Tracking, Navigation, Traffic information, Road tolling, and Road traffic optimisation/steering.

Examples of the MTC applications regarding Payment include Point of sales (POS), Vending machines, and Gaming machines.

Examples of the MTC applications regarding Health include Monitoring vital signs, Supporting the aged or handicapped, Web Access Telemedicine points, and Remote diagnostics.

Examples of the MTC applications regarding Remote Maintenance/Control include Sensors, Lighting, Pumps, Valves, Elevator control, Vending machine control, and Vehicle diagnostics.

Examples of the MTC applications regarding Metering include Power, Gas, Water, Heating, Grid control, and Industrial metering.

Examples of the MTC applications regarding Consumer Devices include Digital photo frame, Digital camera, and eBook.

Further, the above-described embodiments are merely examples of applications of the technical ideas obtained by the inventor. These technical ideas are not limited to the above-described embodiments and various modifications can be made thereto.

The whole or part of the exemplary embodiments disclosed above can be described as, but not limited to, the following supplementary notes.

(Supplementary Note 1)

A base station comprising:
at least one memory; and
at least one processor coupled to the at least one memory and configured to:
  transmit, to a radio terminal, downlink control information (DCI) including a first field for indicating frequency domain resources allocated to the radio terminal and a second field for indicating time domain resources allocated to the radio terminal; and
  reduce a size of the first field as a size of the second field increases.

(Supplementary Note 2)

The base station according to Supplementary Note 1, wherein, while both the size of the first field and the size of the second field can be changed, a maximum total size of the first and second fields is constant.

(Supplementary Note 3)

The base station according to Supplementary Note 1 or 2, wherein the at least one processor is configured to change the size of the second field for indicating the time domain resources based on at least one of:
  subcarrier spacing of Synchronisation Signals/Physical Broadcast Channel (SS/PBCH) blocks associated with a cell in which the base station communicates with the radio terminal;
  a time domain transmission pattern of the SS/PBCH blocks;
  a frequency range to which the SS/PBCH blocks belong; or
  a number of reference signals used for measuring a quality of multiple beams transmitted in the cell.

(Supplementary Note 4)

The base station according to Supplementary Note 1 or 2, wherein the at least one processor is configured to change the size of the second field for indicating the time domain resources based on the number of beams transmitted in a cell in which the base station communicates with the radio terminal.

(Supplementary Note 5)

The base station according to Supplementary Note 1 or 2, wherein the at least one processor is configured to change the size of the second field for indicating the time domain resources based on a parameter regarding a frequency range to which the frequency domain resources belong.

(Supplementary Note 6)

The base station according to any one of Supplementary Notes 1 to 5, wherein
a bandwidth part (BWP) to which the frequency domain resources belong is divided into a plurality of resource block groups (RBGs), each of which consists of a plurality of physical resource blocks,
a maximum size of the first field is determined based on a number of the plurality of RBGs, and
the at least one processor is configured to, when the size of the first field is reduced to less than the maximum size, map at least two RBGs among the plurality of RBGs to a single bit in the first field and map each of the remaining RBGs to a respective one of the remaining bits in the first field.

(Supplementary Note 7)

The base station according to Supplementary Note 6, wherein the at least two RBGs include an RBG located in a lowest frequency end of the BWP or an RBG located in a highest frequency end of the BWP.

(Supplementary Note 8)

The base station according to any one of Supplementary Notes 1 to 5, wherein
a bandwidth part (BWP) to which the frequency domain resources belong is divided into a plurality of resource block groups (RBGs), each of which consists of a plurality of physical resource blocks,
a maximum size of the first field is determined based on a number of the plurality of RBGs, and
the at least one processor is configured to, when the size of the first field is reduced to less the maximum size, increase a size of each RBG included in the plurality of RBGs by a factor of two or more, thereby reducing the number of the plurality of RBGs.

(Supplementary Note 9)

The base station according to any one of Supplementary Notes 1 to 5, wherein
a maximum size of the first field is determined based on a number of resource blocks (RBs) included in a bandwidth part (BWP) to which the frequency domain resources belong, and
the at least one processor is configured to, when the size of the first field is reduced to less than the maximum size, select a start position of RBs to be contiguously allocated to the radio terminal, from a plurality of non-contiguous location candidates that are arranged at intervals of at least 2 RBs.

(Supplementary Note 10)

A radio terminal comprising:
at least one memory; and
at least one processor coupled to the at least one memory and configured to:
  receive, from a base station, downlink control information (DCI) including a first field for indicating frequency domain resources allocated to the radio terminal and a second field for indicating time domain resources allocated to the radio terminal; and
  identify a size of the second field for indicating the time domain resources based on at least one of:
  subcarrier spacing of Synchronisation Signals/Physical Broadcast Channel (SS/PBCH) blocks associated with a cell in which the base station communicates with the radio terminal;
  a time domain transmission pattern of the SS/PBCH blocks;
  a frequency range to which the SS/PBCH blocks belong;
  a number of reference signals used for measuring a quality of multiple beams transmitted in the cell; or
  a parameter regarding a frequency range to which the frequency domain resources belong.

(Supplementary Note 11)

The radio terminal according to Supplementary Note 10, wherein while both the size of the first field and the size of the second field can be changed, a maximum total size of the first and second fields is constant.

(Supplementary Note 12)

A method in a base station, the method comprising:

transmitting, to a radio terminal, downlink control information (DCI) including a first field for indicating frequency domain resources allocated to the radio terminal and a second field for indicating time domain resources allocated to the radio terminal; and reducing a size of the first field as a size of the second field increases.

(Supplementary Note 13)

A method in a radio terminal, the method comprising:

receiving, from a base station, downlink control information (DCI) including a first field for indicating frequency domain resources allocated to the radio terminal and a second field for indicating time domain resources allocated to the radio terminal; and identifying a size of the second field for indicating the time domain resources based on at least one of:

subcarrier spacing of Synchronisation Signals/Physical Broadcast Channel (SS/PBCH) blocks associated with a cell in which the base station communicates with the radio terminal;

a time domain transmission pattern of the SS/PBCH blocks;

a frequency range to which the SS/PBCH blocks belong;

a number of reference signals used for measuring a quality of multiple beams transmitted in the cell; or a parameter regarding a frequency range to which the frequency domain resources belong.

(Supplementary Note 14)

A program for causing a computer to perform a method in a base station, the method comprising:

transmitting, to a radio terminal, downlink control information (DCI) including a first field for indicating frequency domain resources allocated to the radio terminal and a second field for indicating time domain resources allocated to the radio terminal; and reducing a size of the first field as a size of the second field increases.

(Supplementary Note 15)

A program for causing a computer to execute a method in a radio terminal, the method comprising:

receiving downlink control information (DCI) including a first field for indicating frequency domain resources allocated to the radio terminal and a second field for indicating time domain resources allocated to the radio terminal from a base station; and identifying a size of the second field for indicating the time domain resources based on at least one of:

subcarrier spacing of Synchronisation Signals/Physical Broadcast Channel (SS/PBCH) blocks associated with a cell in which the base station communicates with the radio terminal;

a time domain transmission pattern of the SS/PBCH blocks;

a frequency range to which the SS/PBCH blocks belong;

a number of reference signals used for measuring a quality of multiple beams transmitted in the cell; or a parameter regarding a frequency range to which the frequency domain resources belong.

This application is based upon and claims the benefit of priority from Japanese Patent Application No. 2018-175191, filed on Sep. 19, 2018, the disclosure of which is incorporated herein in its entirety by reference.

REFERENCE SIGNS LIST 1 gNB
2 UE
101 Air Interface
804 Processor
805 Memory
903 Baseband Processor
904 Application Processor
906 Memory

What is claimed is:

1. A base station comprising:

at least one memory; and at least one processor coupled to the at least one memory and configured to:

transmit, to a radio terminal, downlink control information (DCI) including a first field for indicating frequency domain resources allocated to the radio terminal and a second field for indicating time domain resources allocated to the radio terminal;

change the size of the second field for indicating the time domain resources based on at least one of:

subcarrier spacing of Synchronisation Signals/Physical Broadcast Channel (SS/PBCH) blocks associated with a cell in which the base station communicates with the radio terminal;

a time domain transmission pattern of the SS/PBCH blocks;

a frequency range to which the SS/PBCH blocks belong; or a number of reference signals used for measuring a quality of multiple beams transmitted in the cell; and reduce a size of the first field as a size of the second field increases.

2. The base station according to claim 1, wherein, while both the size of the first field and the size of the second field can be changed, a maximum total size of the first and second fields is constant.

3. The base station according to claim 1, wherein the at least one processor is configured to change the size of the second field for indicating the time domain resources based on a number of beams transmitted in a cell in which the base station communicates with the radio terminal.

4. The base station according to claim 1, wherein the at least one processor is configured to change the size of the second field for indicating the time domain resources based on a parameter regarding a frequency range to which the frequency domain resources belong.

5. The base station according to claim 1, wherein a bandwidth part (BWP) to which the frequency domain resources belong is divided into a plurality of resource block groups (RBGs), each of which consists of a plurality of physical resource blocks, a maximum size of the first field is determined based on a number of the plurality of RBGs, and the at least one processor is configured to, when the size of the first field is reduced to less than the maximum size, map at least two RBGs among the plurality of RBGs to a single bit in the first field and map each of the remaining RBGs to a respective one of the remaining bits in the first field.

6. The base station according to claim 5, wherein the at least two RBGs include an RBG located in a lowest frequency end of the BWP or an RBG located in a highest frequency end of the BWP.

7. The base station according to claim 1, wherein a bandwidth part (BWP) to which the frequency domain resources belong is divided into a plurality of resource block groups (RBGs), each of which consists of a plurality of physical resource blocks, a maximum size of the first field is determined based on a number of the plurality of RBGs, and the at least one processor is configured to, when the size of the first field is reduced to less the maximum size, increase a size of each RBG included in the plurality of RBGs by a factor of two or more, thereby reducing the number of the plurality of RBGs.

8. The base station according to claim 1, wherein
a maximum size of the first field is determined based on a number of resource blocks (RBs) included in a bandwidth part (BWP) to which the frequency domain resources belong, and the at least one processor is configured to, when the size of the first field is reduced to less than the maximum size, select a start position of RBs to be contiguously allocated to the radio terminal, from a plurality of non-contiguous location candidates that are arranged at intervals of at least 2 RBs.

9. A radio terminal comprising:
at least one memory; and
at least one processor coupled to the at least one memory and configured to:
  receive from a base station downlink control information (DCI) including a first field for indicating frequency domain resources allocated to the radio terminal and a second field for indicating time domain resources allocated to the radio terminal; and
  identify a size of the second field for indicating the time domain resources based on at least one of:
    subcarrier spacing of Synchronisation Signals/Physical Broadcast Channel (SS/PBCH) blocks associated with a cell in which the base station communicates with the radio terminal;
    a time domain transmission pattern of the SS/PBCH blocks;
    a frequency range to which the SS/PBCH blocks belong;
    a number of reference signals used for measuring a quality of multiple beams transmitted in the cell; or
    a parameter regarding a frequency range to which the frequency domain resources belong.

10. The radio terminal according to claim 9, wherein while both the size of the first field and the size of the second field can be changed, a maximum total size of the first and second fields is constant.

11. A method in a base station, the method comprising:
transmitting, to a radio terminal, downlink control information (DCI) including a first field for indicating frequency domain resources allocated to the radio terminal and a second field for indicating time domain resources allocated to the radio terminal;
changing the size of the second field for indicating the time domain resources based on at least one of:
  subcarrier spacing of Synchronisation Signals/Physical Broadcast Channel (SS/PBCH) blocks associated with a cell in which the base station communicates with the radio terminal;
  a time domain transmission pattern of the SS/PBCH blocks;
  a frequency range to which the SS/PBCH blocks belong; or
  a number of reference signals used for measuring a quality of multiple beams transmitted in the cell; and
reducing a size of the first field as a size of the second field increases.

12. The method according to claim 11, wherein, while both the size of the first field and the size of the second field can be changed, a maximum total size of the first and second fields is constant.

13. The method according to claim 11, further comprising changing the size of the second field for indicating the time domain resources based on a number of beams transmitted in a cell in which the base station communicates with the radio terminal.

14. The method according to claim 11, further comprising changing the size of the second field for indicating the time domain resources based on a parameter regarding a frequency range to which the frequency domain resources belong.

15. The method according to claim 11, wherein
a bandwidth part (BWP) to which the frequency domain resources belong is divided into a plurality of resource block groups (RBGs), each of which consists of a plurality of physical resource blocks,
a maximum size of the first field is determined based on a number of the plurality of RBGs, and
the method further comprises, when the size of the first field is reduced to less than the maximum size, mapping at least two RBGs among the plurality of RBGs to a single bit in the first field and mapping each of the remaining RBGs to a respective one of the remaining bits in the first field.

16. The method according to claim 15, wherein the at least two RBGs include an RBG located in a lowest frequency end of the BWP or an RBG located in a highest frequency end of the BWP.

17. The method according to claim 11, wherein
a bandwidth part (BWP) to which the frequency domain resources belong is divided into a plurality of resource block groups (RBGs), each of which consists of a plurality of physical resource blocks,
a maximum size of the first field is determined based on a number of the plurality of RBGs, and
the method further comprises, when the size of the first field is reduced to less the maximum size, increasing a size of each RBG included in the plurality of RBGs by a factor of two or more, thereby reducing the number of the plurality of RBGs.

18. The method according to claim 11, wherein
a maximum size of the first field is determined based on a number of resource blocks (RBs) included in a bandwidth part (BWP) to which the frequency domain resources belong, and
the method further comprises, when the size of the first field is reduced to less than the maximum size, selecting a start position of RBs to be contiguously allocated to the radio terminal, from a plurality of non-contiguous location candidates that are arranged at intervals of at least 2 RBs.

* * * * *